US008601099B1

(12) United States Patent
Zenz et al.

(10) Patent No.: US 8,601,099 B1
(45) Date of Patent: Dec. 3, 2013

(54) SYSTEM AND METHOD FOR MANAGING MULTIPLE SEVER NODE CLUSTERS USING A HIERARCHICAL CONFIGURATION DATA STRUCTURE

(75) Inventors: Ingo Zenz, Epfenbach (DE); Krasimir Semerdzhiev, Sofia (BG); Pham Quang, Sofia (BG)

(73) Assignee: SAP AG, Walldorf (DE)

( * ) Notice: Subject to any disclaimer, the term of this patent is extended or adjusted under 35 U.S.C. 154(b) by 3596 days.

(21) Appl. No.: 10/750,043

(22) Filed: Dec. 30, 2003

(51) Int. Cl.
*G06F 15/177* (2006.01)
*G06F 15/173* (2006.01)

(52) U.S. Cl.
USPC .......................... 709/220; 709/221; 709/223

(58) Field of Classification Search
USPC ............ 707/8, 10, 103 R, 201; 709/223–225, 709/228, 248
See application file for complete search history.

(56) References Cited

U.S. PATENT DOCUMENTS

| | | | |
|---|---|---|---|
| 4,939,724 A | | 7/1990 | Ebersole |
| 5,553,239 A | | 9/1996 | Heath et al. |
| 5,925,098 A | * | 7/1999 | Freund et al. ................. 709/203 |
| 6,003,075 A | | 12/1999 | Arendt et al. |
| 6,014,669 A | | 1/2000 | Slaughter et al. |
| 6,157,928 A | * | 12/2000 | Sprenger et al. ...................... 1/1 |
| 6,300,948 B1 | | 10/2001 | Geller et al. |
| 6,366,915 B1 | | 4/2002 | Rubert et al. |
| 6,501,491 B1 | | 12/2002 | Brown et al. |
| 6,523,035 B1 | | 2/2003 | Fleming et al. |
| 6,564,261 B1 | | 5/2003 | Gudjonsson et al. |
| 6,658,018 B1 | | 12/2003 | Tran et al. |
| 6,886,035 B2 | | 4/2005 | Wolff |
| 6,892,231 B2 | * | 5/2005 | Jager .............................. 709/220 |
| 6,944,829 B2 | | 9/2005 | Dando |
| 6,954,757 B2 | | 10/2005 | Zargham et al. |
| 6,973,473 B1 | | 12/2005 | Novaes et al. |
| 7,047,497 B2 | | 5/2006 | Patrizio et al. |
| 7,093,247 B2 | | 8/2006 | Ashworth et al. |
| 7,117,242 B2 | * | 10/2006 | Cherkasova et al. .......... 709/203 |
| 7,127,472 B1 | | 10/2006 | Enokida et al. |
| 7,139,817 B1 | * | 11/2006 | English et al. ................. 709/220 |
| 7,165,189 B1 | | 1/2007 | Lakkapragada et al. |
| 7,181,731 B2 | | 2/2007 | Pace et al. |
| 7,185,071 B2 | | 2/2007 | Berg et al. |
| 7,228,369 B2 | | 6/2007 | Nakamura |
| 7,251,662 B2 | | 7/2007 | Behman et al. |

(Continued)

OTHER PUBLICATIONS

Final Office Action dated Nov. 16, 2007, U.S. Appl. No. 10/750,003, filed Dec. 30, 2003, whole document.

(Continued)

*Primary Examiner* — Kenny Lin
*Assistant Examiner* — Scott M Sciacca
(74) *Attorney, Agent, or Firm* — Schwegman Lundberg & Woessner, P.A.

(57) ABSTRACT

A system and method are described for managing a plurality of sever nodes. In one embodiment, the sever nodes are organized into groups referred to as "instances." Each instance includes a group of redundant sever nodes and a dispatcher for distributing service requests to each of the sever nodes. In addition, a central message passing architecture is defined which allows the various instances to communicate with one another. In one embodiment, a hierarchical configuration data object is stored within a database and is centrally accessible by all of the servers from all of the instances. The hierarchical configuration data object organizes configuration data and binary data in a logical hierarchy which simplifies sever node management in an enterprise network.

18 Claims, 12 Drawing Sheets

(56) References Cited

U.S. PATENT DOCUMENTS

| | | | |
|---|---|---|---|
| 7,577,731 B2* | 8/2009 | Frey et al. ............... | 709/223 |
| 2002/0069272 A1* | 6/2002 | Kim et al. ............... | 709/221 |
| 2002/0078132 A1 | 6/2002 | Cullen et al. | |
| 2002/0124082 A1* | 9/2002 | San Andres et al. ........ | 709/225 |
| 2002/0161750 A1 | 10/2002 | Rajarajan et al. | |
| 2002/0161870 A1* | 10/2002 | French et al. ............ | 709/222 |
| 2003/0033428 A1* | 2/2003 | Yadav .................... | 709/238 |
| 2003/0093420 A1 | 5/2003 | Ramme | |
| 2004/0019639 A1* | 1/2004 | E et al. ................. | 709/205 |
| 2004/0019662 A1* | 1/2004 | Viswanath et al. ......... | 709/220 |
| 2004/0128370 A1 | 7/2004 | Kortright | |
| 2004/0148183 A1 | 7/2004 | Sadiq | |
| 2004/0148369 A1 | 7/2004 | Strassner | |
| 2004/0153639 A1 | 8/2004 | Cherian et al. | |
| 2004/0193952 A1* | 9/2004 | Narayanan et al. .......... | 714/13 |
| 2004/0249904 A1 | 12/2004 | Moore et al. | |
| 2004/0249918 A1 | 12/2004 | Sunshine | |
| 2004/0254584 A1 | 12/2004 | Sarin et al. | |
| 2004/0260748 A1 | 12/2004 | Springer et al. | |
| 2004/0260773 A1 | 12/2004 | Springer | |
| 2004/0268298 A1* | 12/2004 | Miller et al. ............ | 717/106 |
| 2005/0015471 A1 | 1/2005 | Zhang et al. | |
| 2005/0055686 A1 | 3/2005 | Buban et al. | |
| 2005/0114315 A1 | 5/2005 | Tanner et al. | |
| 2005/0268294 A1 | 12/2005 | Petev et al. | |
| 2006/0010438 A1 | 1/2006 | Brady, Jr. et al. | |
| 2006/0106590 A1 | 5/2006 | Tseng et al. | |
| 2008/0189428 A1* | 8/2008 | Godwin et al. ........... | 709/230 |

OTHER PUBLICATIONS

Non-Final Office Action dated Jul. 21, 2008, U.S. Appl. No. 10/750,003, filed Dec. 30, 2003, whole document.

Non-Final Office Action dated Oct. 27, 2008, U.S. Appl. No. 10/749,957, filed Dec. 30, 2003, whole document.

Non-Final Office Action dated Jan. 25, 2008, U.S. Appl. No. 10/749,957, filed Dec. 30, 2003, whole document.

Final Office Action dated Jul. 10, 2008, U.S. Appl. No. 10/749,957, filed Dec. 30, 2003, whole document.

Non-Final Office Action dated Jun. 10, 2008, U.S. Appl. No. 10/749,623, filed Dec. 30, 2003, whole document.

Final Office Action dated Nov. 26, 2007, U.S. Appl. No. 10/749,623, filed Dec. 30, 2003, whole document.

Non-Final Office Action dated Oct. 15, 2008, U.S. Appl. No. 10/749,851, filed Dec. 30, 2003, whole document.

Non-Final Office Action dated Oct. 3, 2007, U.S. Appl. No. 10/750,002, filed Dec. 30, 2003, whole document.

Final Office Action dated Apr. 14, 2008, U.S. Appl. No. 10/750,002, filed Dec. 30, 2003, whole document.

Nuno, Preguica, et al., "Data Management Support for Asynchronous Groupware", ACM, 2000, pp. 69-78.

Oetiker, Tobias, "SEPP Software Installation and Sharing System", Proceedings of the Twelfth Systems Administration Conference (LISA '98), Boston, Massachusetts, Dec. 6-11, 1998, pp. 253-260.

* cited by examiner

SYSTEM AND METHOD FOR MANAGING MULTIPLE SEVER NODE CLUSTERS USING A HIERARCHICAL CONFIGURATION DATA STRUCTURE

BACKGROUND

1. Field of the Invention

This invention relates generally to the field of data processing systems. More particularly, the invention relates to a system and method for managing configuration data for a plurality of sever nodes.

2. Description of the Related Art

Figure 1A:
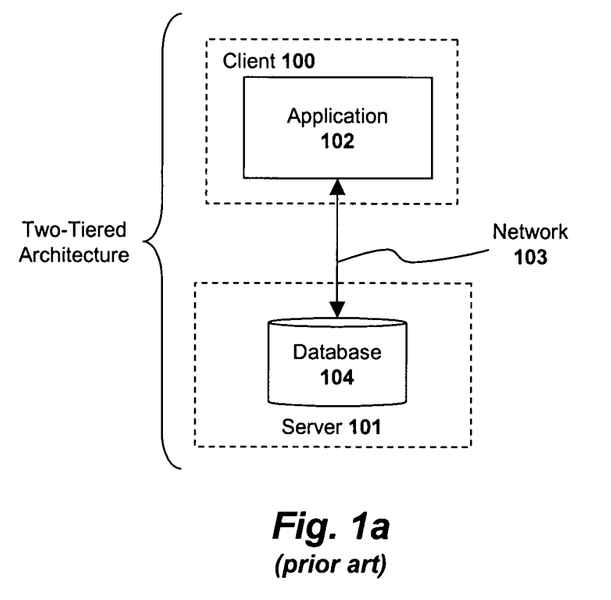
FIG. 1a illustrates a traditional two-tier client-server architecture.

Traditional client-server systems employ a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

Figure 1B:
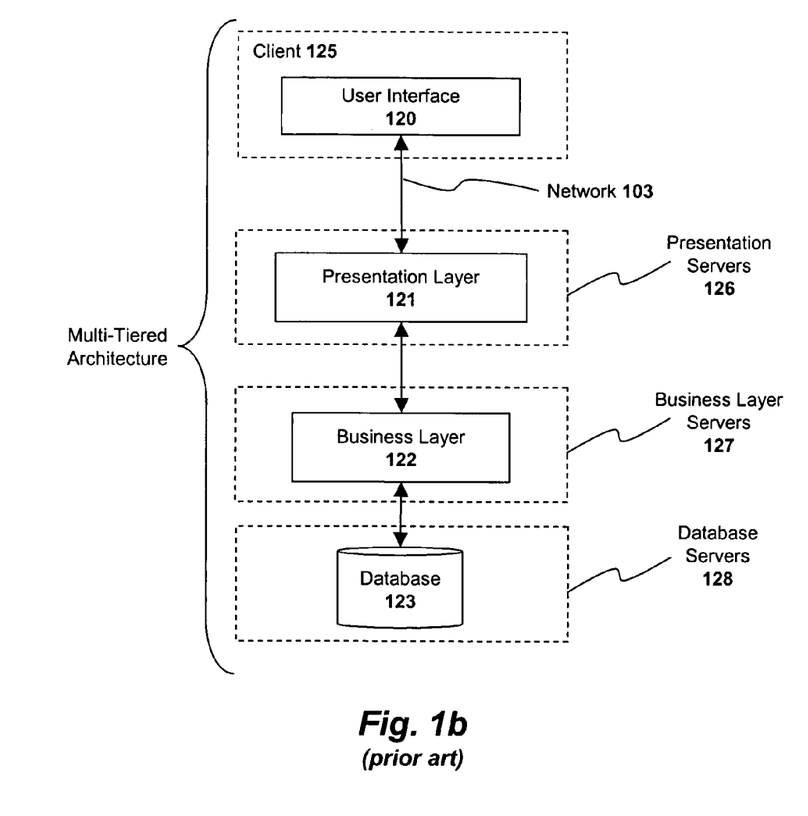
FIG. 1b illustrates a prior art multi-tier client-server architecture.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

Although the multi-tiered system illustrated in FIG. 1b provides a more flexible and scalable architecture, it also results in significant additional complexity. For example, managing multiple clusters of presentation layer servers, business layer servers and databases, and the dependencies between them requires a significant amount of network administration overhead. Accordingly, new techniques which simplify the startup and management of multi-tiered enterprise systems are desirable.

SUMMARY

A system and method are described for managing a plurality of sever nodes. In one embodiment, the sever nodes are organized into groups referred to as "instances." Each instance includes a group of redundant sever nodes and a dispatcher for distributing service requests to each of the sever nodes. In addition, a central message passing architecture is defined which allows the various instances to communicate with one another. In one embodiment, a hierarchical configuration data object is stored within a database and is centrally accessible by all of the servers from all of the instances. The hierarchical configuration data object organizes configuration data and binary data in a logical hierarchy which simplifies sever node management in an enterprise network.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for managing multiple sever node clusters using a central database arrangement. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of the Invention

Figure 2:
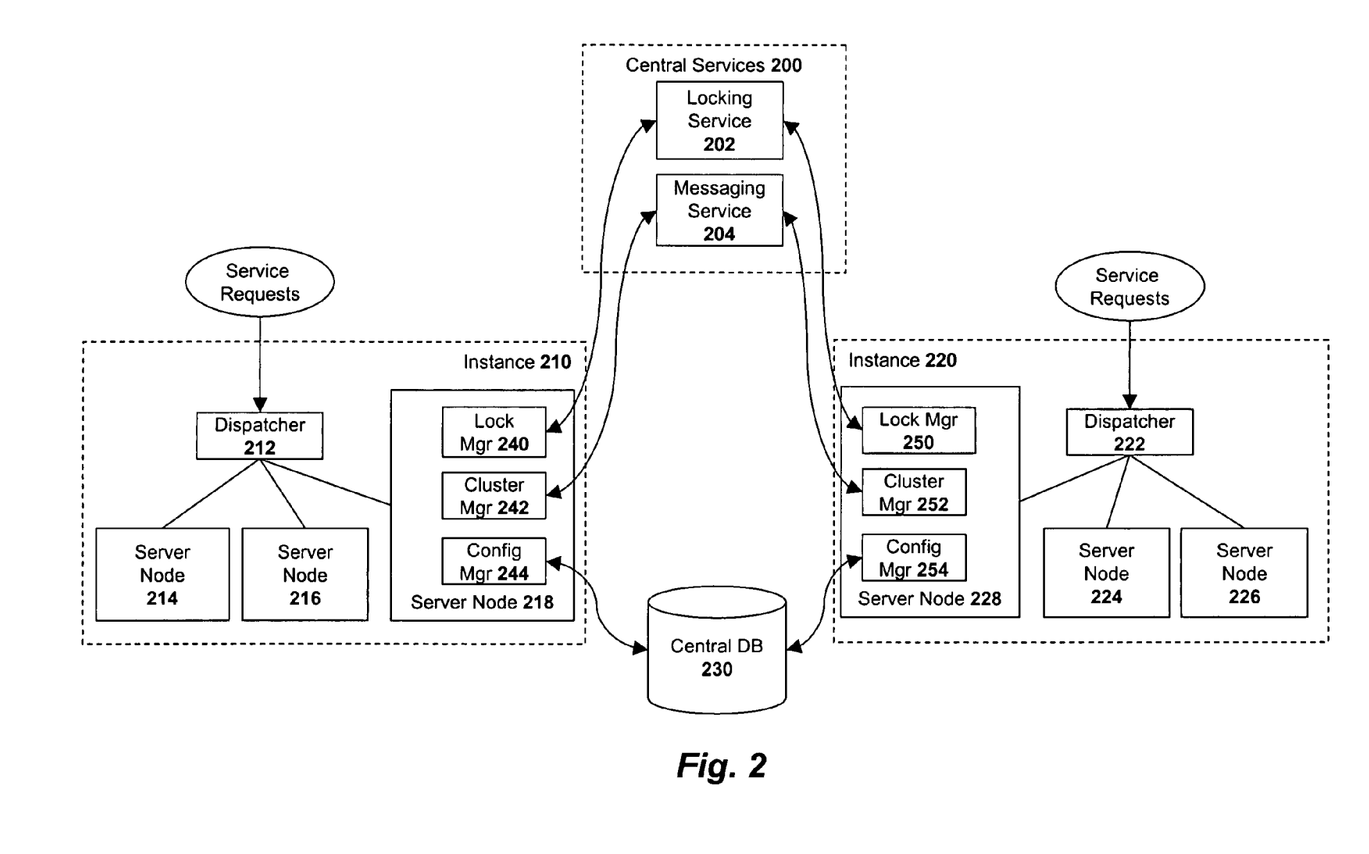
FIG. 2 illustrates a sever node system architecture according to one embodiment of the invention.

A system architecture according to one embodiment of the invention is illustrated in FIG. 2. The architecture includes a central services instance 200 and a plurality of application server instances 210, 220. As used herein, the application server instances, 210 and 220, each include a group of sever nodes 214, 216, 218 and 224, 226, 228, respectively, and a dispatcher, 212, 222, respectively. The central services instance 200 includes a locking service 202 and a messaging service 204 (described below). The combination of all of the application instances 210, 220 and the central services instance 200 is referred to herein as a "cluster." Although the following description will focus solely on instance 210 for the purpose of explanation, the same principles apply to other instances such as instance 220.

The sever nodes 214, 216, 218 within instance 210 provide the business and/or presentation logic for the network applications supported by the system. Each of the sever nodes 214, 216, 218 within a particular instance 210 may be configured with a redundant set of application logic and associated data. In one embodiment, the dispatcher 210 distributes service requests from clients to one or more of the sever nodes 214, 216, 218 based on the load on each of the servers. For example, in one embodiment, the dispatcher 210 implements a round-robin policy of distributing service requests.

The sever nodes 214, 216, 218 may be Java 2 Enterprise Edition ("J2EE") sever nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 210, 220 is enabled via the central services instance 200. As illustrated in FIG. 2, the central services instance 200 includes a messaging service 204 and a locking service 202. The message service 204 allows each of the servers within each of the instances to communicate with one another via a message passing protocol. For example, messages from one server may be broadcast to all other servers within the cluster via the messaging service 204 (e.g., such as the cache configuration messages described below). Alternatively, messages may be addressed directly to specific servers within the cluster (i.e., rather than being broadcast to all servers).

In one embodiment, the locking service 202 disables access to (i.e., locks) certain specified portions of configuration data and/or program code stored within a central database 230. The locking manager locks data on behalf of various system components which need to synchronize access to specific types of data and program code (e.g., such as the configuration managers 244, 254 illustrated in FIG. 2). As described in detail below, the locking service enables a distributed caching architecture for caching copies of server/dispatcher configuration data.

In one embodiment, the messaging service 204 and the locking service 202 are each implemented on dedicated servers. However, the messaging service 204 and the locking service 202 may be implemented on a single server or across multiple servers while still complying with the underlying principles of the invention.

As illustrated in FIG. 2, each sever node (e.g., 218, 228) includes a lock manager 240, 250 for communicating with the locking service 202; a cluster manager 242, 252 for communicating with the messaging service 204; and a configuration manager 244, 254 for communicating with a central database 230 (e.g., to store/retrieve configuration data as described herein). Although the lock manager 240, 250, cluster manager 242, 252 and configuration manager 244, 254 are illustrated only with respect to sever nodes 218 and 228 in FIG. 2, each of the sever nodes 214, 216, 224 and 226 and/or on the dispatchers 212, 222 may be equipped with equivalent lock managers, cluster managers and configuration managers while still complying with the underlying principles of the invention.

One Embodiment of a Hierarchical Configuration Data Object

Figure 3:
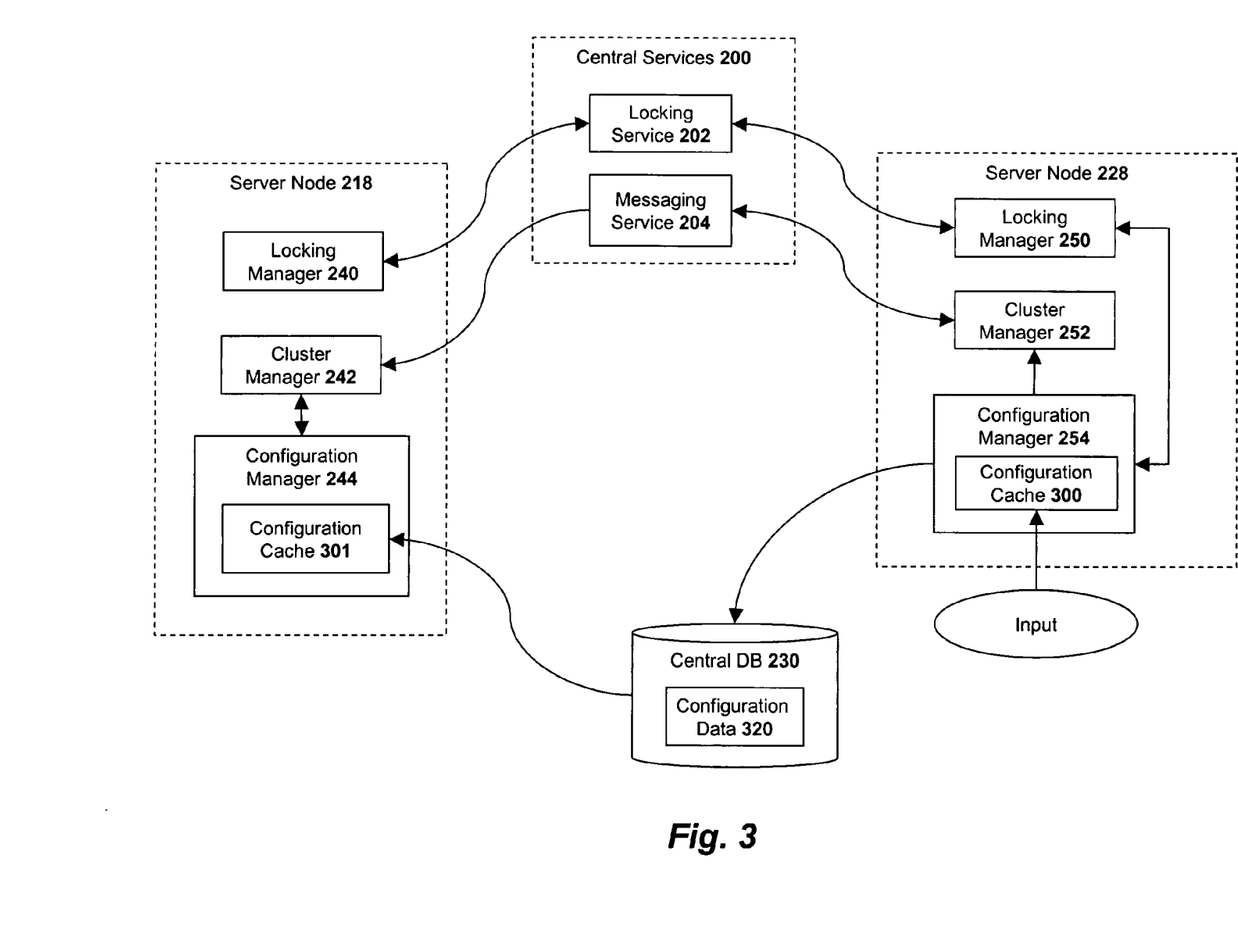
FIG. 3 illustrates a sever node system architecture which employs a configuration data caching.

Referring now to FIG. 3, in one embodiment, configuration data 320 defining the configuration of the central services instance 200 and/or the sever nodes and dispatchers within instances 210 and 220, is stored within the central database 230. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 244, 254 cache configuration data locally within configuration caches 300, 301. As such, to ensure that the configuration data within the configuration caches 300, 301 remains up-to-date, the configuration managers 244, 254 implement cache synchronization policies, as described herein.

Figure 4:
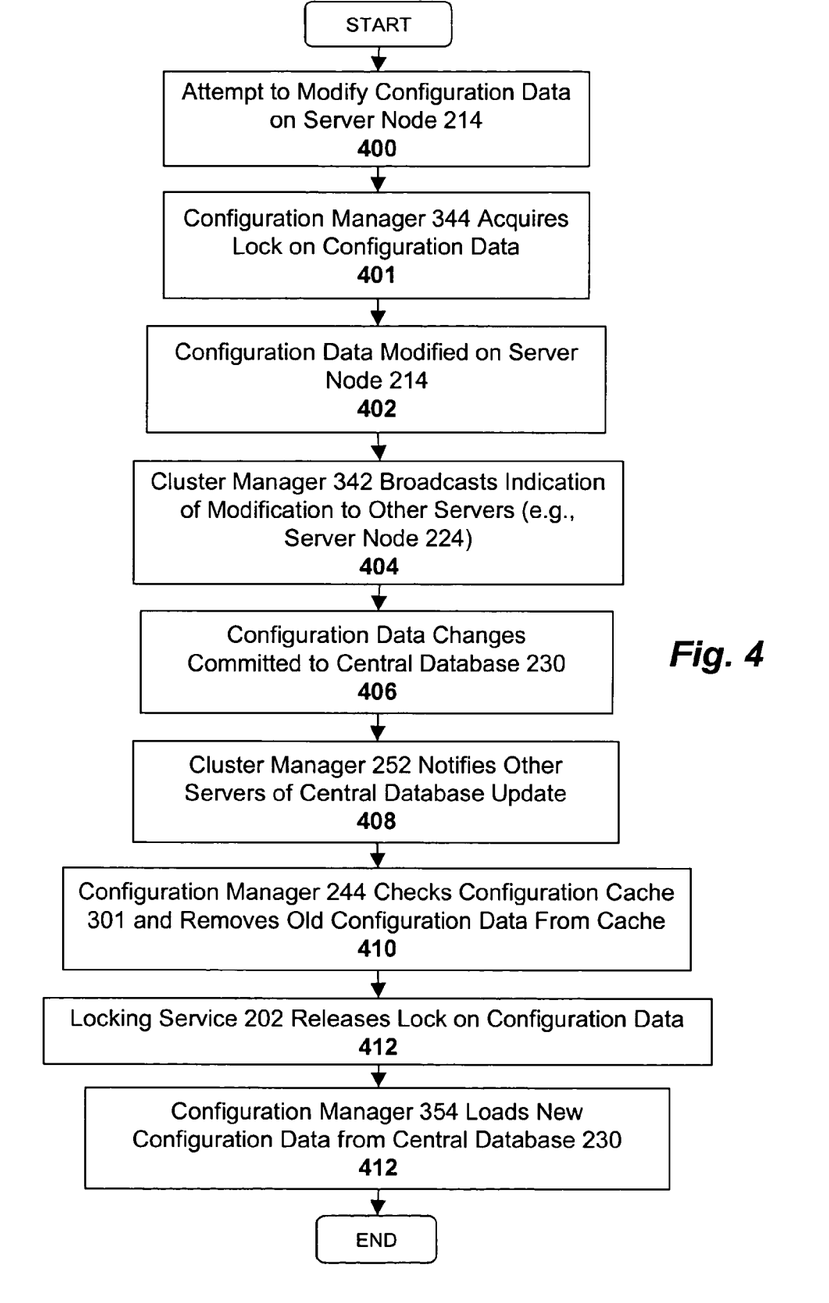
FIG. 4 illustrates a method for synchronizing configuration data according to one embodiment of the invention.

One embodiment of a method for synchronizing configuration data across each of the application server instances 210, 220 and the central services instance 200 is illustrated in FIG. 4. It is assumed initially that certain portions of the configuration data from the central database is cached locally within configuration cache 300 and configuration cache 301.

At 400 (FIG. 4), a user or network administrator attempts to modify the configuration data stored within configuration cache 300 on sever node 228. In response, the configuration manager 254 attempts to acquire a lock on the relevant portions of the configuration data by transmitting a lock request to the locking service 202. If the configuration data is not being currently modified by another transaction, then the locking service locks the configuration data on behalf of the configuration manager 254. Once locked, the configuration managers 244 of other sever nodes 218 will not be permitted to access or acquire a lock on the configuration data.

At 402, the configuration data within the configuration cache 300 of sever node 228 is modified. At 404, the cluster manager 252 broadcasts an indication of the modified data to the cluster manager 242 on sever node 218 and the cluster manager of other sever nodes (i.e., via the messaging service 204). At 406, the modifications to the configuration data are committed to the central database 230. In one embodiment, the modifications to the configuration data are registered within a hierarchical configuration data object 500, described below with respect to FIG. 5.

At 408, the cluster manager 252 notifies the cluster manager 242 on sever node 218 and the cluster managers of other sever nodes of the central database update. In response, the configuration manager 244 invalidates the modified configuration data from its cache 301 and, at 412, loads the new configuration data from the central database 230. In one embodiment, the configuration manager 244 only downloads the portion of the configuration data which has been modified (i.e., rather than the entire set of configuration data). To determine whether it needs to update its configuration data, the configuration manager 244 compares the version of its configuration data with the version of the configuration data stored the central database. For example, in one embodiment, it compares an index of the data stored locally on the server/dispatcher and the hierarchical configuration data object illustrated in FIG. 5 to determine whether the configuration data at the server/dispatcher is out-of-date.

The method set forth in FIG. 4 may be rearranged in a variety of ways while still complying with the underlying principles of the invention. For example, in one embodiment, the configuration manager 244 may delete the configuration data within its cache 301 as soon as the indication of the modification is transmitted at 404. Similarly, the locking service 202 may release the lock on the configuration data as soon as the changes to the configuration data are committed to the central database at 406. Various other reorganizations of the method elements from FIG. 4 are also contemplated within the scope of the present invention.

Figure 5:
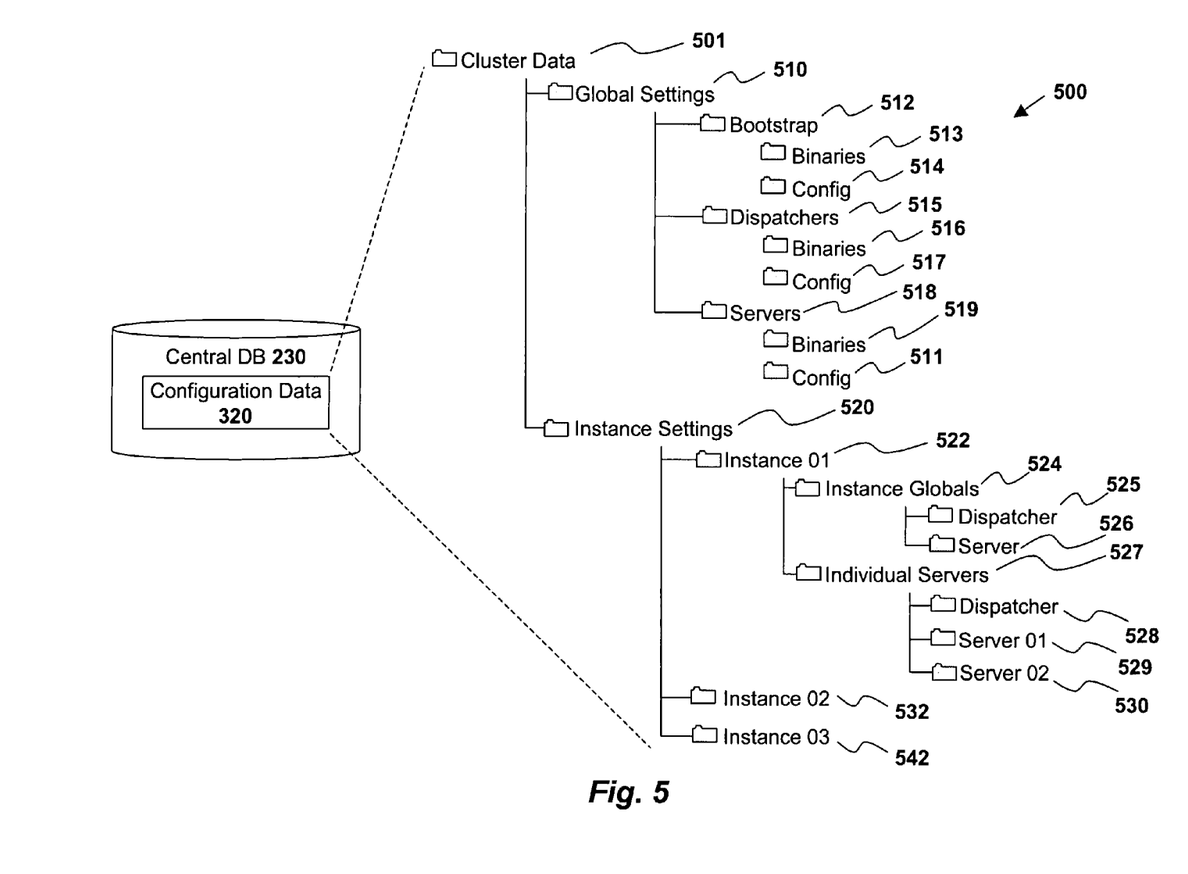
FIG. 5 illustrates a hierarchical representation of configuration data employed in one embodiment of the invention.

As illustrated in FIG. 5, in one embodiment, a hierarchical data object 500 stored within the central database 230 is used to manage the various different types of configuration data employed within the cluster. At the root of the hierarchy is the "cluster data" object 501. In one embodiment, the cluster data object 501 includes two primary sub-configuration objects: a "global settings" object 510 and an "instance settings" object 520. As suggested by its name, the global settings object 510 contains, within its logical hierarchy, global configuration data associated with all servers in the cluster (e.g., all sever node, dispatchers, and servers within the central services instance 200). Conversely, the instance settings object 520 contains server-specific configuration data (i.e., specific to each individual instances, dispatchers and servers).

In one embodiment, multiple sub-configuration objects are provided beneath the global settings object 510, for example, a "bootstrap" object 512; a "dispatchers" object 515 and a "servers" object 518. The bootstrap object 512 contains data associated with the cluster startup or "boot" process. Specifically, in one embodiment, the bootstrap object 512 contains a "binaries" object 513, which contains an indication of the binaries (i.e., program code) required during the boot process, and a "configuration" object 514 containing parameters associated with the boot process. By way of example, and not limitation, in a Java implementation, the binaries indicated within the binaries object 513 may identify the program code required for starting the Java virtual machine and the configuration object 514 may include the parameters to be used when initializing the virtual machine.

The "dispatchers" object 515 includes a "binaries" object 516 identifying the common binaries required by each of the dispatchers within the cluster, and a "configuration" object 517 identifying the common parameters associated with all of the dispatchers in the cluster. Similarly, the "servers" object 518 includes a "binaries" configuration object 519 identifying the common binaries required by each of the sever nodes within the cluster, and a configuration object 511 identifying the common parameters associated with each of the sever nodes within the cluster.

As mentioned above, the "instance settings" object 520 contains server/instance-specific configuration settings. In one embodiment, a plurality of "instance" sub-configuration objects, such as sub-configuration objects 522, 532, and 542, are listed under the instance settings object 520, each of which identify a particular instance within the cluster. By way of example, the "Instance 01" object 522 illustrated in FIG. 5 includes an "instance globals" object 524 and an "individual servers" object 527. The instance globals object 524 identifies binaries and settings which apply to all dispatchers 525 and/or servers 526 within the specified instance ("Instance 01"). By contrast, the "individual servers" object 527 identifies the server layout of each instance and contains server-specific settings for each dispatcher 528 and server 529, 530 within the specified instance. For example, the "individual servers" object 527 defines the number of servers within the instance and identifies each server and dispatcher with a unique network ID and network port (i.e., for communicating with the server/dispatcher).

Figure 6:
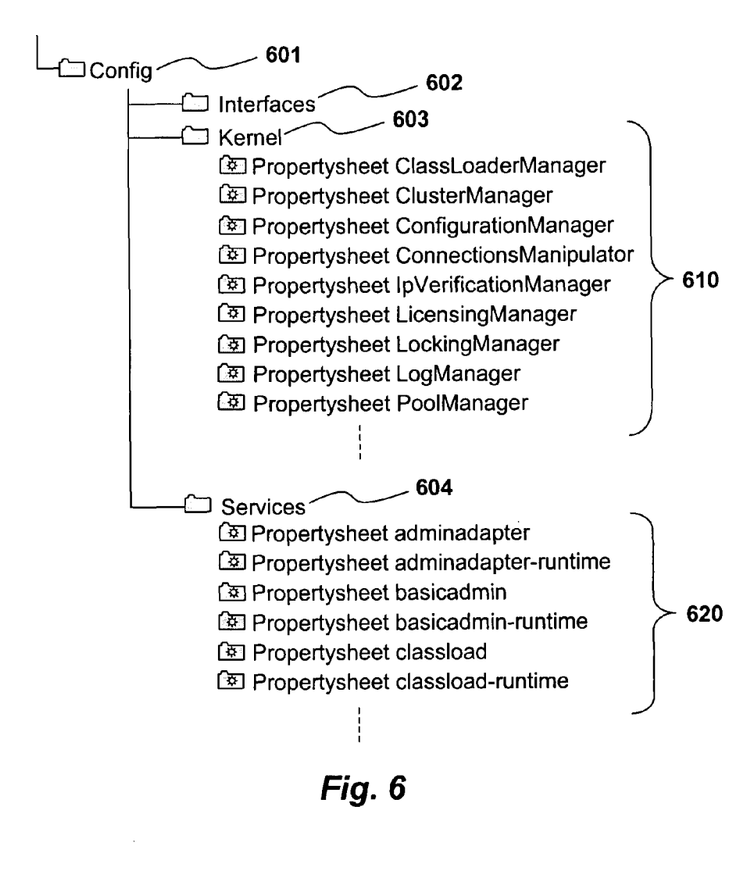
FIG. 6 illustrates a plurality of property sheet data object employed within a configuration hierarchy according to one embodiment of the invention.

Moreover, in one embodiment, the various "configuration" objects and "binaries" objects described herein may be further sub-divided into sub-configuration objects defining specific types of configuration parameters and binaries. For example, the "binaries" objects may include sub-configuration objects for the OS libraries (e.g., Java classfile libraries) and application-specific libraries required on each server. Similarly, the "configuration" objects may include sub-configuration objects which logically subdivide the configuration parameters into logical categories. By way of example, and not limitation, FIG. 6 illustrates one embodiment in which a "configuration" object 601 includes sub-configuration objects for interfaces 602, kernel 603 and services 604. In a Java environment, for example, the kernel of the J2EE Engine forms the bases for all services. It implements resource management (e.g., Thread management, Class loading Strategy, Configuration Management Framework, . . . etc) on top of the Java Virtual Machine. Part of the kernel configuration may also include configuration of the underlying Java VM. In one embodiment, services 604 include those services defined by the Java 2 Enterprise Edition (J2EE) standard as well as additional proprietary services, and the interfaces 602 allow various J2EE components to communicate with one another.

One Embodiment of a Property Sheet

The kernel object 603 and services object 604 illustrated in FIG. 6 each include a plurality of "property sheet" objects 610 and 620, respectively, positioned at the bottom of the configuration hierarchy. The property sheet objects 610, 620 contain the underlying configuration parameters/arguments used for each server/dispatcher within the cluster. Specifically, in one embodiment, each property sheet comprises a plurality of name-value pairs representing a name and respective value (or set of values) for each parameter.

Figure 7A:
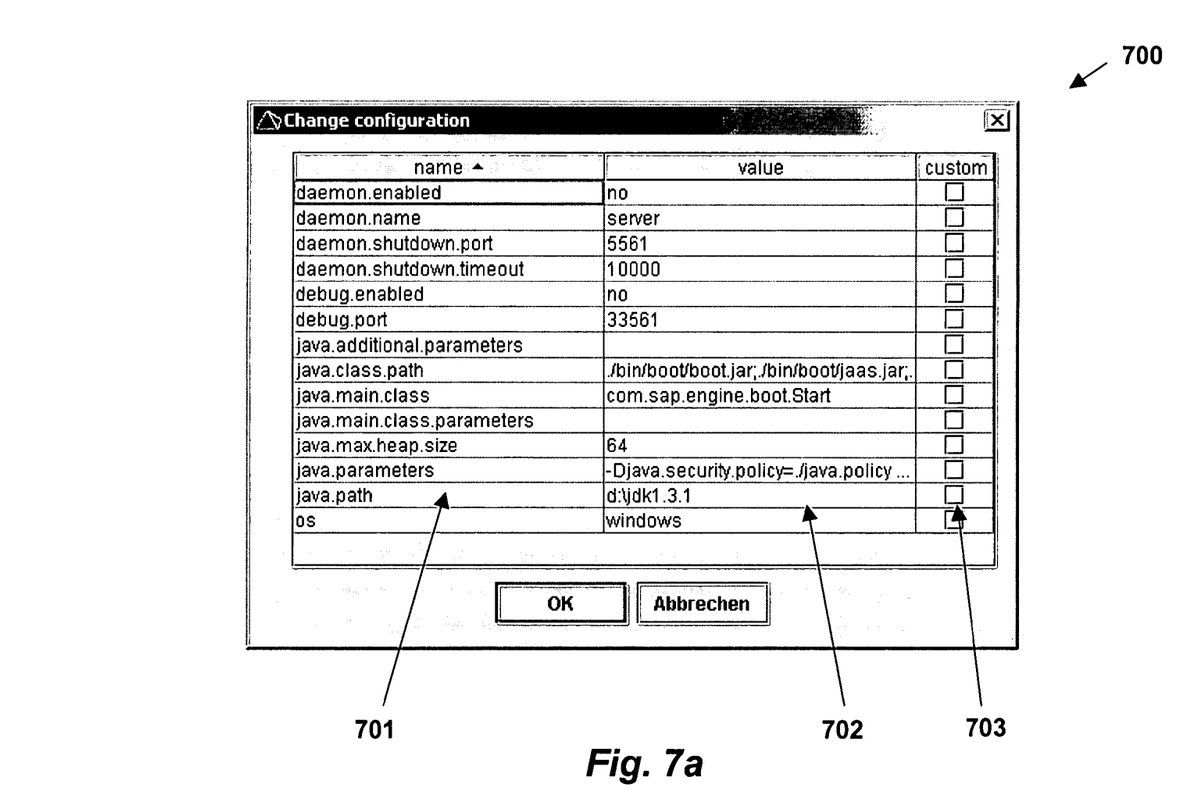
FIGS. 7a-c illustrate one embodiment of a property sheet which retains a default value for each parameter even when a custom value is entered.

In one embodiment of the invention, each parameter name within the property sheet is associated with a default value and (potentially) a custom value. FIG. 7a illustrates an exemplary view of a property sheet 700 which includes a name column 701 containing a list of parameter names, a value column 702 containing the current value associated with each of the parameter names and a column containing "custom" check-boxes 703 which indicate whether the current value of each parameter is the default value or a custom value.

Figure 7B:
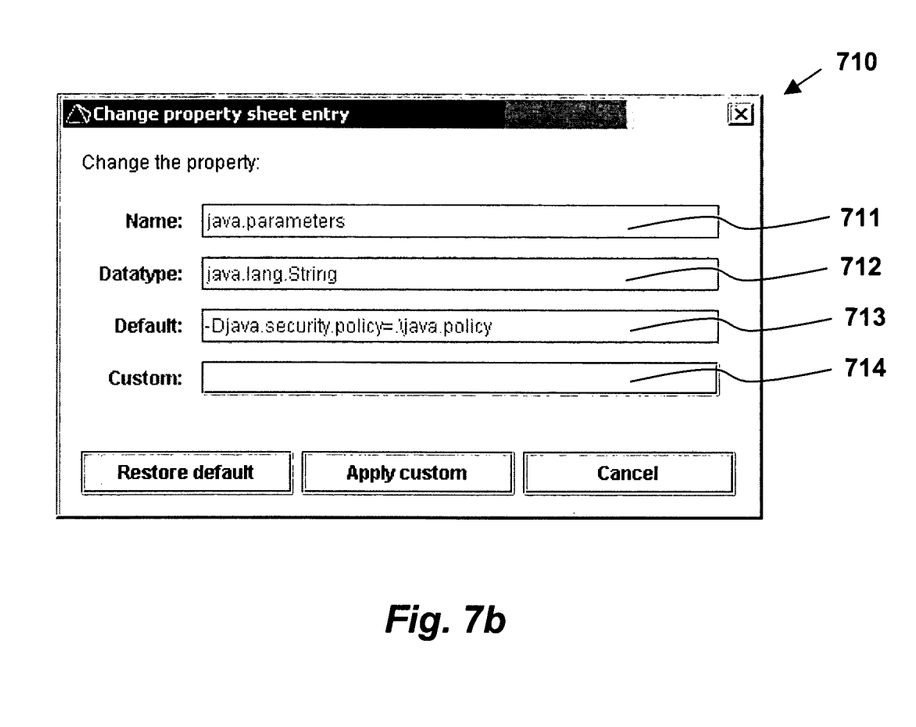

In one embodiment, in response to a user selecting one of the check-boxes 703, a data entry window 710 such as that illustrated in FIG. 7b is generated. The window 710 includes a field for the parameter name 711, a field for the data type of the parameter 712 (e.g., integer, string, . . . etc), a field containing the default value of the parameter 713, and a "custom" field 714 into which a custom parameter value may be entered by an end user.

Figure 7C:
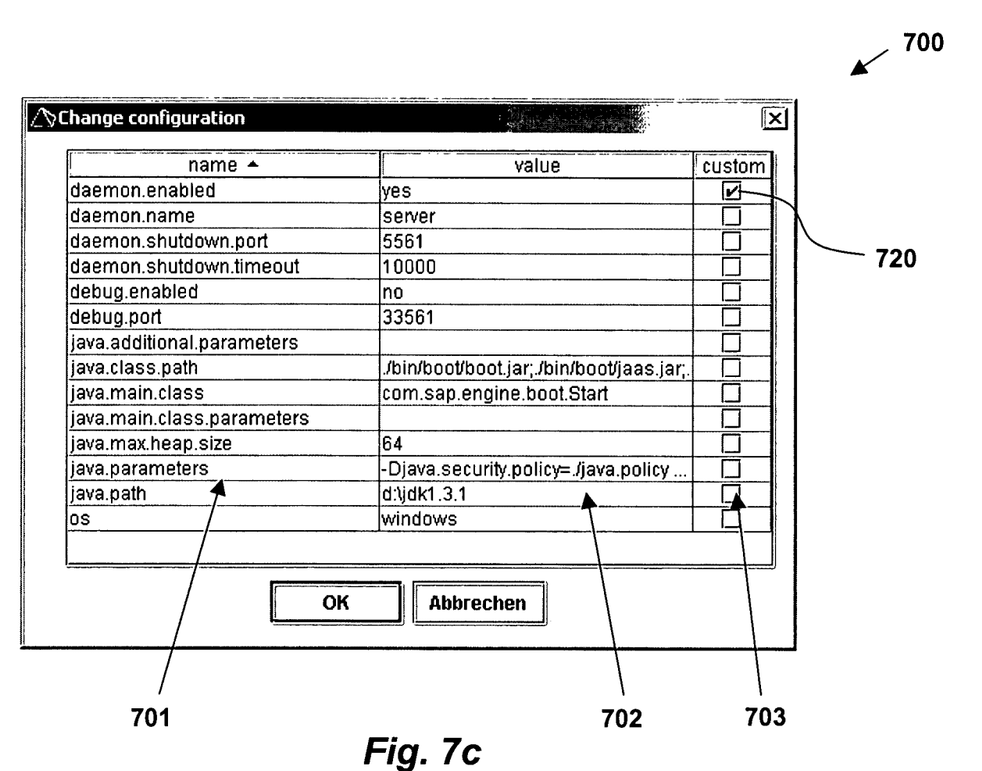

As illustrated in FIG. 7c, if a custom value is entered in the custom value field 714, a check mark 720 appears in the row associated with the parameter value. Even when a custom value is entered, however, in one embodiment of the invention, the default value associated with the parameter is always preserved. As such, if an end user modifies a particular value within a particular configuration object, the default value can always be recovered (e.g., for troubleshooting purposes).

Using a central, hierarchical configuration object for managing configuration data as described above is beneficial in a variety of circumstances. For example, the configuration manager 244, 254 on each server may determine whether to invalidate a particular set of configuration data which has been modified within the cache of another server based on the location of the configuration data within the hierarchy. If the configuration data is located within the "global settings" object, for example, then the configuration manager may invalidate the data (i.e., because it applies to every server within the cluster). By contrast, if the configuration data is located within the "individual servers" object, then the configuration manager may skip invalidation of the data (i.e., because it only applies to a specific server within a specific instance). Of course, the hierarchical representation may be used for a variety of different network management applications while still complying with the underlying principles of the invention.

One Embodiment of a System and Method for Starting Instances

Figure 8:
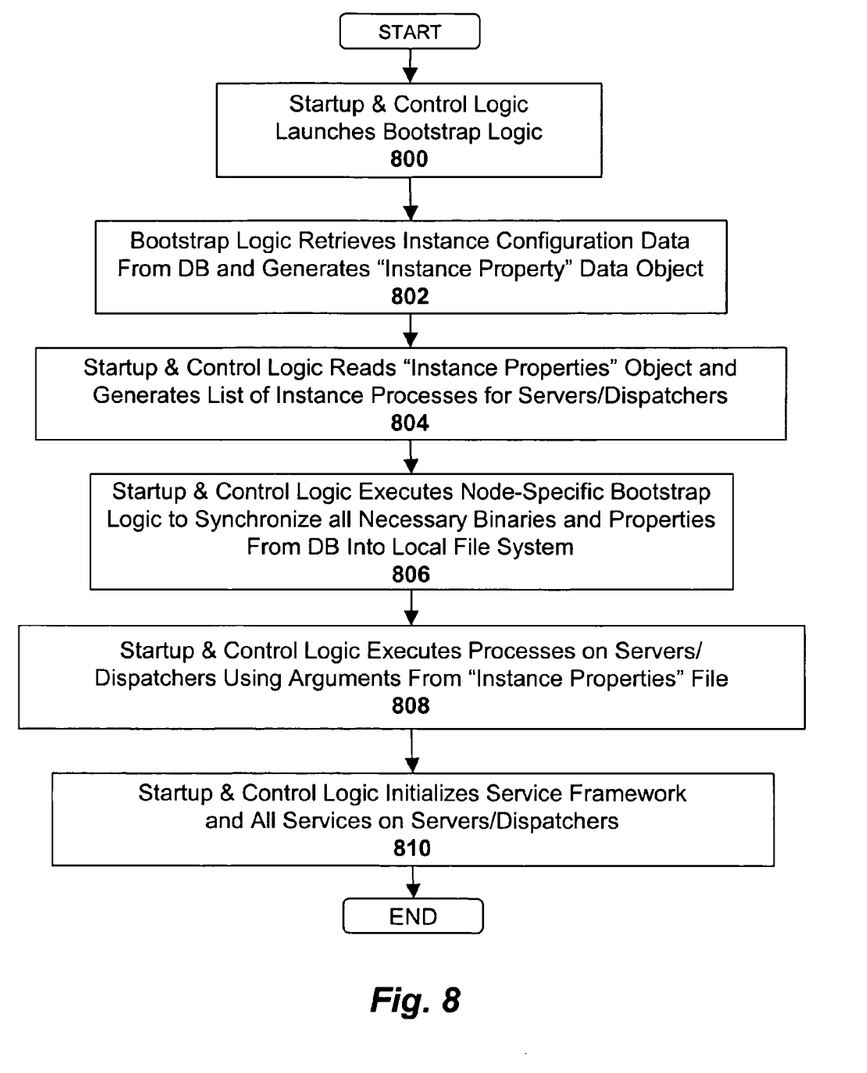
FIG. 8 illustrates a method for starting up one or more instances according to one embodiment of the invention.
Figure 9:
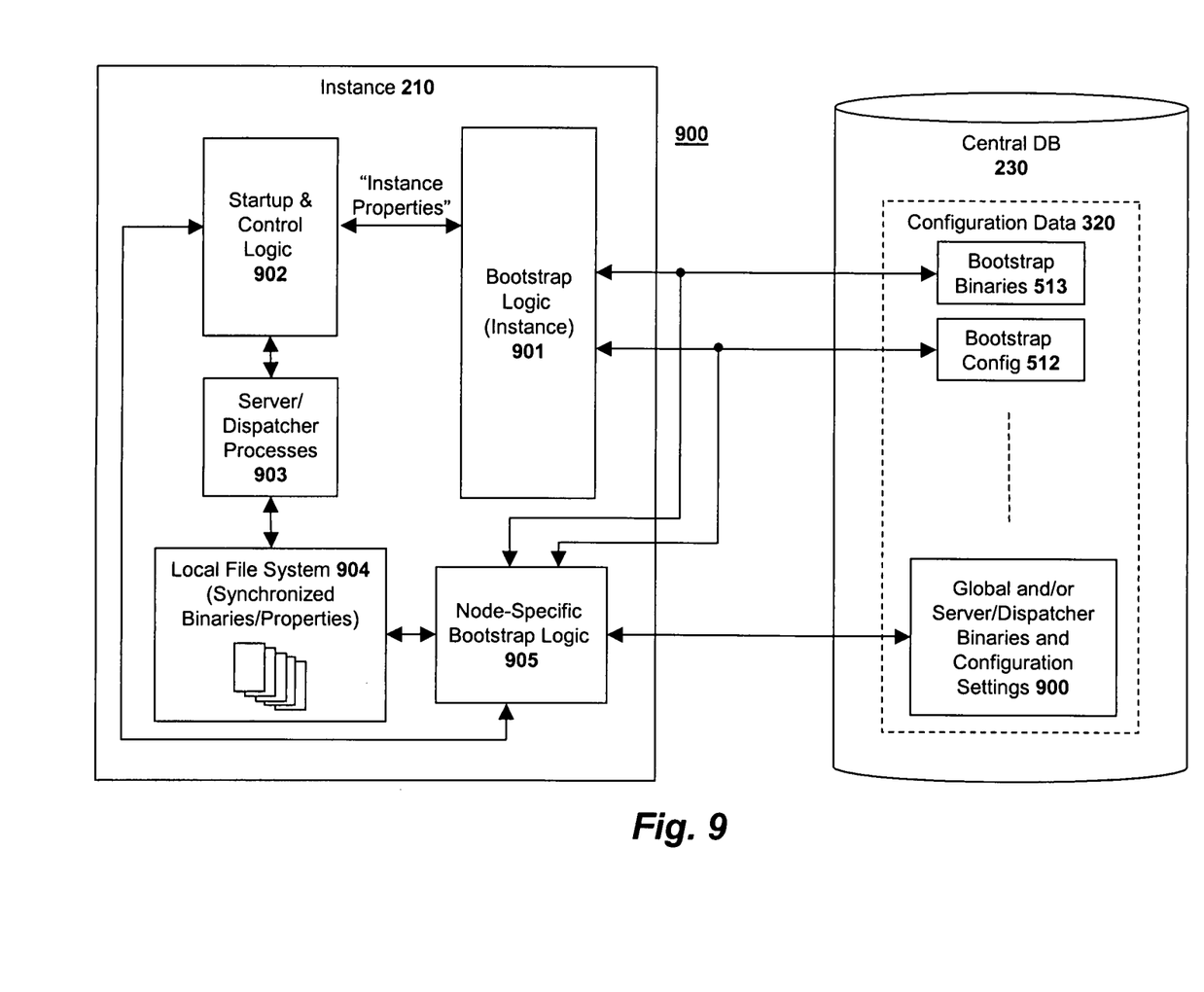
FIG. 9 illustrates one embodiment of a startup framework for implementing the method illustrated in FIG. 8.

One embodiment of the invention employs a unique startup framework for starting and stopping the various server instances within the cluster. FIGS. 8 and 9 illustrate an exemplary startup method and framework, respectively. The startup framework 900 includes startup and control logic 902 and bootstrap logic 901. In one embodiment, the startup and control logic 902 provides the central point of control for the instance 210 and for all processes 903 executed within the servers and dispatchers of the instance 210. For example, the instance startup procedure described herein may be performed under the control of the startup and control logic 902.

Turning to the method illustrated in FIG. 8, at 800, the startup and control logic 902 launches the bootstrap logic 901 to initiate startup of the instance (e.g., in response to a startup command entered by a network administrator). As illustrated in FIG. 9, the bootstrap logic 901 is comprised of bootstrap binaries 513 stored within the central database 230 and the configuration of the bootstrap logic 901 is defined by configuration parameters 512 stored within the central database 230 (i.e., within the configuration data hierarchy 320). Thus, if necessary, the bootstrap logic 901 may be modified/updated at the central database 230 and subsequently distributed to servers/instances during the startup process.

At 802, the bootstrap logic 901 retrieves up-to-date configuration data 320 from the central database 230 including the layout of the instance 210 (e.g., identifying the servers and dispatchers to be started) and the parameters/arguments to be used for each server and dispatcher within the instance 210. In one embodiment, the bootstrap logic 901 uses this information to construct a description of the instance, which it provides to the startup and control logic 902 in the form of an "Instance Properties" data object. In one embodiment, the Instance Properties data object is a text file containing a list of servers/dispatchers and associated parameters which the startup and control logic 902 parses to determine the instance layout and instance settings. However, various alternate data formats may be employed for the Instance Properties file while still complying with the underlying principles of the invention (e.g., such as the "Extensible Markup Language" or "XML" format).

At 804, using the instance layout and parameters/arguments from the Instance Properties data object, the startup and control logic 902 builds a list of servers and/or dispatchers to be started, including an indication of the specific instance processes to be started on each server/dispatcher. In one embodiment of the invention, at 806 (FIG. 8) prior to starting each server/dispatcher identified in the list, the startup and control logic 902 launches node-specific bootstrap logic 905 to synchronize the binaries and configuration settings on each server and/or dispatcher. For example, depending on how long the instance 210 was inoperative, the global and/or server/dispatcher-specific binaries and configuration settings 900 may have changed within the central database 230. Accordingly, in one embodiment, when the node-specific bootstrap logic 905 is launched, it compares the binaries and configuration settings stored in the local file system of the server/dispatcher being started to the binaries and configuration settings 900 stored in the central database 230.

In one embodiment, a comparison is performed between an index of the data stored locally on the server/dispatcher and an index of the data stored within the central database 320 (e.g., an index based on the hierarchical structure illustrated in FIG. 5) to determine whether the configuration data at the server/dispatcher is out-of-date.

Regardless of how the comparison is performed, if the binaries and/or configuration settings stored within the local file system 904 of the dispatcher/server are out-of-date, then the current binaries and/or configuration settings 900 are retrieved from the central database 230 and stored within the local file system 904 of the dispatcher/server. In one embodiment, only the binaries and/or configuration settings which are new are copied to the local file system 904, thereby conserving network bandwidth and server resources.

Once synchronization is complete, at 808, the startup and control logic 902 executes the processes on each of the servers using arguments/parameters included within the Instance Properties data object. At 810, the startup and control logic 902 initializes the service framework and services on the servers/dispatchers within the instance 210. For example, the service framework and services are the J2EE service framework and J2EE services, respectively, in a Java environment. However, various other types of services/frameworks may be employed while still complying with the underlying principles of the invention. Once the framework and services are running, the sever nodes are available to process service requests.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments of the invention described above use a specific hierarchy within the configuration data object 500, various alternate organizational hierarchies may be defined while still complying with the underlying principles of the invention. For example, in one embodiment, a separate "binaries" configuration object is provided directly beneath the "cluster data" object (i.e., rather than rather than merely under each of the sub-configuration objects illustrated in FIG. 5). Similarly, as an alternative to a "property sheet" for storing configuration parameters, files and name value pairs may also be used. For example, files may map a key name to a large group of data, whereas a name value pair may map a key name to a small group of data.

Accordingly, the scope and spirit of the invention should be judged in terms of the claims which follow.

What is claimed is:

1. A system comprising:
a plurality of server nodes communicatively coupled on an enterprise network, the plurality of server nodes comprising one or more application server instances, each application server instance comprising a dispatcher and a group of server nodes, the dispatcher executable by a processor to distribute service requests from clients to each of the server nodes based on loads of each of the server nodes, the server nodes configured to serve applications over the enterprise network to a plurality of clients; and
a hierarchical data object to store an indication of configuration data and binaries associated with each of the server nodes, the hierarchical data object comprising a global subhierarchy and a non-global sub-hierarchy, the global sub-hierarchy containing an indication of configuration data and binaries associated with all of the server nodes and the non-global subhierarchy containing an indication of configuration data and binaries associated with specified individual server nodes, the global sub-hierarchy including a dispatchers sub-hierarchy containing binaries and configuration data associated with each of the dispatchers and a servers sub-hierarchy containing binaries and configuration data associated with each of the servers;
wherein one or more of the server nodes is further configured to determine whether to invalidate a particular set of configuration data modified within a cache of another server node based on a location of the configuration data within the global subhierarchy.

2. The system as in claim 1 further comprising a central database for storing the hierarchical data object, configuration data and binaries.

3. The system as in claim 1 wherein the global sub-hierarchy includes a bootstrap sub-hierarchy containing binaries and configuration data for starting each of the server nodes.

4. The system as in claim 1 wherein the non-global sub-hierarchy includes an instance sub-hierarchy for each application server instance.

5. The system as in claim 4 wherein each instance sub-hierarchy includes an instance globals sub-hierarchy containing binaries and/or configuration data associated with each dispatcher and server within the respective instance.

6. The system as in claim 5 wherein each instance sub-hierarchy includes an individual servers sub-hierarchy containing binaries and/or configuration data associated with each individual dispatcher and server within the respective instance.

7. A method comprising:
storing binaries and configuration data associated with a plurality of sever nodes within a hierarchical data object, the hierarchical data object to store a representation of configuration data and binaries associated with each of the sever nodes, the hierarchical data object comprising a global sub-hierarchy and a non-global sub-hierarchy, the global sub-hierarchy containing configuration data and binaries associated with all of the sever nodes and the non-global sub-hierarchy containing configuration data and binaries associated with specified individual sever nodes, each application server instance comprising a dispatcher and a group of server nodes, the dispatcher executable by a processor to distribute service requests from clients to each of the server nodes based on loads of each of the server nodes, the server nodes configured to serve applications over the enterprise network to a plurality of clients.

8. The method as in claim 7 further comprising storing the hierarchical data object, configuration data and binaries within a central database, the central database accessible by the server nodes.

9. The method as in claim 7 wherein the global sub-hierarchy includes a bootstrap sub-hierarchy containing binaries and configuration data for starting each of the server nodes.

10. The method as in claim 7 wherein the global sub-hierarchy includes a dispatchers sub-hierarchy containing binaries and configuration data associated with each of the dispatchers and a servers sub-hierarchy containing binaries and configuration data associated with each of the servers.

11. The method as in claim 7 wherein the non-global sub-hierarchy includes an instance sub-hierarchy for each application server instance.

12. The method as in claim 11 wherein each instance sub-hierarchy includes an instance globals sub-hierarchy containing binaries and/or configuration data associated with each dispatcher and server within the respective instance.

13. The method as in claim 12 wherein each instance sub-hierarchy includes an individual servers sub-hierarchy containing binaries and/or configuration data associated with each individual dispatcher and server within the respective instance.

14. A method for updating configuration settings for a plurality of server nodes comprising:
   modifying configuration data at a first server node in a group of server nodes associated with a dispatcher, the dispatcher configured to distribute service requests from clients to server nodes;
   registering the modification within a hierarchical configuration data object stored within a central database, the hierarchical configuration data object to store a representation of configuration data associated with each of the server nodes and stored in a global sub-hierarchy including a dispatchers sub-hierarchy containing binaries and configuration data associated with one or more dispatchers and a servers sub-hierarchy containing binaries and configuration data associated with one or more servers;
   communicating an indication of the modification to one or more other server nodes;
   reading the hierarchical data object to identify the modified configuration data and determine if the configuration data stored on the other server nodes is out-of-date; and
   downloading the modified configuration data from the central database to the other server nodes if the configuration data stored on the other server nodes is out-of-date.

15. The method as in claim 14 further comprising:
   downloading the modified configuration data from the central database to the other server nodes if the indication of the modified configuration data is located within the global sub-hierarchy.

16. The method as in claim 14 further comprising:
   if the indication of the modified configuration data is located within the non-global sub-hierarchy, then determining whether the modified configuration data is associated with all servers within a particular instance, and
   if the modified configuration data is associated with all servers within a particular instance, then downloading the modified configuration data from the central database to all server nodes within the particular instance.

17. The method as in claim 14 further comprising:
   acquiring a lock on the configuration data prior to modifying the configuration data at the first server node.

18. The method as in claim 17 further comprising:
   releasing the lock on the configuration data after the configuration data has been updated at the central database and/or at each of the server nodes.

* * * * *